United States Patent
Ramjee et al.

(10) Patent No.: US 6,842,462 B1
(45) Date of Patent: Jan. 11, 2005

(54) WIRELESS ACCESS OF PACKET BASED NETWORKS

(75) Inventors: Ramachandran Ramjee, Matawan, NJ (US); Thomas F. La Porta, Thornwood, NY (US); Kannan Varadhan, Woodbridge, NJ (US); Luca Salgarelli, Middletown, NJ (US); Mark Haner, Westfield, NJ (US); Arun Narayan Netravali, Westfield, NJ (US); Gerard Terence Foster, Swindon (GB)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/466,485

(22) Filed: Dec. 17, 1999

Related U.S. Application Data (60) Provisional application No. 60/112,718, filed on Dec. 18, 1998.

(51) Int. Cl.⁷ ............................................. H04J 3/16
(52) U.S. Cl. ..................... 370/466; 370/328; 370/338; 370/352; 370/395.52; 370/401; 455/433; 455/435
(58) Field of Search ....................... 370/230, 231, 370/236.2, 328, 331, 352, 353, 354, 355, 356, 360, 389, 395.52, 401, 402, 466, 467, 465, 338; 455/432, 433, 435, 436, 439

(56) References Cited

U.S. PATENT DOCUMENTS

| | | | | |
|---|---|---|---|---|
| 5,416,842 A | * | 5/1995 | Aziz ............................ | 380/30 |
| H1837 H | * | 2/2000 | Fletcher et al. ............. | 455/433 |
| 6,137,791 A | * | 10/2000 | Frid et al. ................... | 370/352 |
| 6,170,057 B1 | * | 1/2001 | Inoue et al. ................. | 713/153 |
| 6,208,627 B1 | * | 3/2001 | Menon et al. ............... | 370/328 |
| 6,396,828 B1 | * | 5/2002 | Liu .............................. | 370/352 |
| 6,407,988 B1 | * | 6/2002 | Agraharam et al. ......... | 370/328 |
| 6,434,134 B1 | * | 8/2002 | La Porta et al. ............. | 370/338 |
| 6,577,637 B1 | * | 6/2003 | Sieppi ......................... | 370/401 |
| 2002/0089958 A1 | * | 7/2002 | Feder et al. ................ | 370/338 |

* cited by examiner

*Primary Examiner*—Dang Ton
*Assistant Examiner*—Shick Hom

(57) ABSTRACT

A General Packet Radio Service (GPRS) Accessed Extended Mobile Internet Protocol (EMIP) [G-EMIP] network is provided for wireless mobile device access to external packet data networks. Domains are defined to incorporate a subnet of standard GPRS and EMIP network entities accessed through a Domain Router. Packet access at the radio interface is provided using the base station portion of a GPRS network. Wireless link specific processing is relegated to this potion of the G-EMIP network. EMIP is utilized as a backbone network to provide mobility and service management and interconnection to external networks. A GPRS-IP Interworking entity (GII) interworks IP and GPRS protocols between GPRS and IP addressable network entities (i.e., translates messages of each protocol to corresponding messages of the other protocol). Mobility-related functionality is handled at the IP (network) layer. Mobile IP is used to support the macro-mobility and Handoff-Aware Wireless Access Internet Infrastructure (HAWAII) is used to support micro-mobility and paging. The Domain Router provides packet service management and interacts with a Home Location Register/Authentication Center, which provides GRPS registration, authentication and encryption.

15 Claims, 4 Drawing Sheets

WIRELESS ACCESS OF PACKET BASED NETWORKS

RELATED APPLICATIONS

The invention is related to U.S. Provisional Application 60/112,718, filed on Dec. 18, 1998, entitled GENERAL PACKET RADIO SERVICE (GPRS) ACCESSED EXTENDED MOBILE INTERNET PROTOCOL [G-EMIP], the subject matter thereof being fully incorporated by reference herein. This application is also related to U.S. patent application Ser. No. 09/210,072, entitled WIRELESS ACCESS TO PACKET-BASED NETWORKS, filed Dec. 11, 1998 and assigned to Lucent Technologies, the assignee herein. The cross-referenced application is herein incorporated into this disclosure by reference.

FIELD OF THE INVENTION

The invention relates to the Internet and other packet-based networks and more particularly to methods for wireless access to packet-based networks by mobile devices.

BACKGROUND

Traffic on the Internet is growing exponentially due to an increasing number of subscribers and the introduction of new applications. Wide area wireless networks are also experiencing rapid subscriber growth. Currently, there are many efforts underway to provide data services on wireless access networks. Accordingly, next generation wireless access network standards are being defined in the hope of expanding wireless service.

To provide data services, existing wireless access network architectures require several specialized components tailored for their respective wireless link technologies even though the services provided by these different wireless networks are fairly similar. For this reason, existing networks are not easily integrated. As a result of this specialization and its associated cost, the cost of wireless service remains a reason that wide-area wireless data services have not grown at the rate of their wired counterparts. Other reasons for the slower growth of wireless data services, such as the lack of bandwidth on the wireless interface and the form factor of wireless devices, have been addressed to some extent with the development of new communication standards and portable wireless devices. For example, the General Packet Radio Service (GPRS) and the Enhanced Data Rates for GSM Evolution (EDGE) standards allow wireless packet access at hundreds of kilobits per second. Global System for Mobile Communications (GSM) is a standard for mobile communication systems that specifies features of a network. Current GSM networks provide only switched circuit services, which are characterized by exclusive usage of traffic channel resources over both the radio interface and the network resources for the duration of a call. GPRS provides a packet data overlay service for GSM, allowing concurrent usage of the same resources by multiple subscribers. In this way, GPRS adds a GSM-centric packet access capability to the existing wireless access technology.

Previous network architectures for data services have concentrated on purely Internet Protocol (IP) based wireline networks. GRPS does not borrow heavily from the standard IP paradigm but instead allows only a constrained usage of IP standards. Further reductions in the cost of wireless data services may be achieved through the reuse of existing infrastructure from IP packet networks and adherence to well-accepted data networking standards. Such a methodology will integrate wireless and wireline packet data networks and allow applications written for wired data networks to operate on both types of networks. In addition, advances made in IP packet technology, such as IP telephony and Quality of Service (QoS) standards, will be able to be directly applied to wireless networks that incorporate additional IP standards.

SUMMARY OF THE INVENTION

The General Packet Radio Service (GPRS) accessed Extended Mobile Internet Protocol (EMIP) [G-EMIP] network of the invention utilizes EMIP as a backbone network for GPRS packet wireless data. The EMIP backbone network provides mobility management, service management and interconnection to external networks while being integrated within the existing GPRS access network of base transceiver stations and base controller stations. This base station portion of GPRS provides packet access at the radio interface to mobile devices. In this manner, IP standards are applied more directly to a GPRS system. The resultant network is a homogeneous, IP-based wireless access network. Other wireless interfaces may be utilized; the resultant network is independent of the protocol of the wireless interface.

A domain-based division of IP mobility protocols is utilized so that most mobile device mobility may be localized to a domain. All mobility-related functionality is handled at the IP (network) layer. Wireless link specific processing is relegated to only the GRPS base station portion of the network. The network of the invention uses the Mobile IP standard for supporting macro-mobility of mobile devices and Handoff-Aware Wireless Access Internet Infrastructure (HAWAII) for supporting micro-mobility and paging functionality. IP layer software running in routers and base station controllers in the access network is extended to connect to a GPRS-IP Interworking entity (GII). The GII is addressable by both IP and GPRS portions of the network. The GII interworks IP and GPRS protocols between the routers and base stations, translating GRPS specific messages to IP specific messages and IP specific messages to GRPS specific messages. The Domain Router is enhanced to interact with a Home Location Register/Authentication Center, which provides GRPS registration, authentication and encryption for mobile device attached to the network. IP telephony and quality of service (QoS) standards may be applied to the network to support voice applications.

BRIEF DESCRIPTION OF THE DRAWINGS

For a better understanding of the present invention, reference may be had to the following description of exemplary embodiments thereof, considered in conjunction with the accompanying drawings, in which.

In the detailed description below, like reference numerals are used to describe the same, similar or corresponding elements in FIGS. 1–5b.

DETAILED DESCRIPTION

Although the present invention is illustrated and described herein as an embodiment utilized for wireless access to Internet Protocol (IP) based networks, such as the Internet or intranets, the embodiment is merely illustrative and should not be construed as being so limited. The present invention is equally applicable for wireless access to any packet-based network from a mobile device.

Mobile Internet Protocol (MIP)

Figure 1:
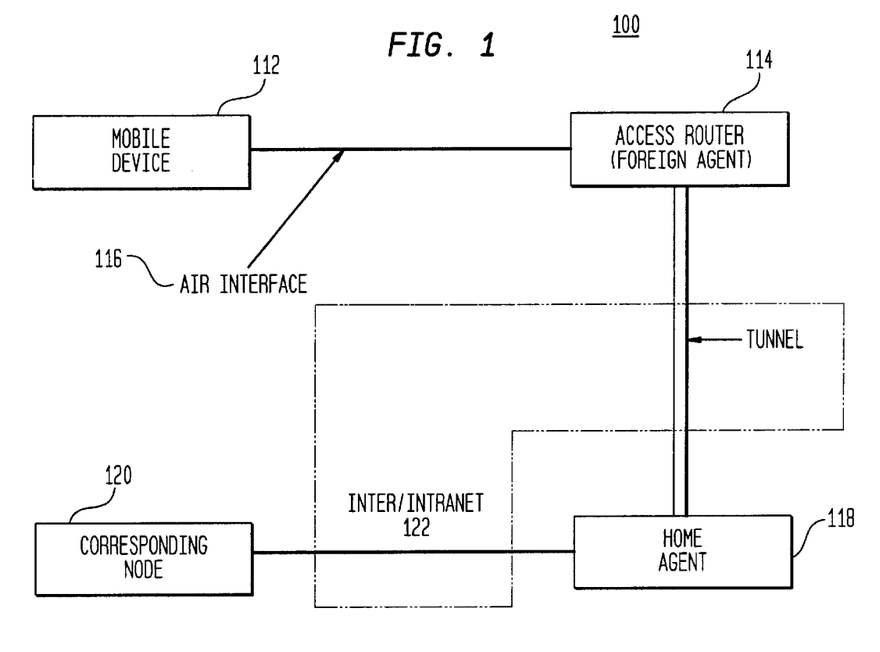
FIG. 1 illustrates a generic Mobile Internet Protocol (MIP) network for mobile devices.

FIG. 1 illustrates a generic Mobile Internet Protocol (MIP) network 100. A mobile device 112 attaches to the network 100 through a router 114 that terminates a radio interface (not shown). Generally, the radio interface may be on a different network entity than the router but connected to the router through a subnet (i.e., a portion of the hierarchy of network entities in a network). The mobile device 112 and the router 114 communicate via an air interface 116. Two mobility agents inside the network, a home agent 118 and a foreign agent 114, keep track of the location of the mobile device. The mobile device 112 is always identified by two addresses, a home address that corresponds to its home subnet and a care-of address that corresponds to the subnet to which it is currently attached. These addresses are often an address that identifies an interface on an agent serving the mobile device.

The mobile device receives a care-of address from the serving subnet when the mobile device 112 attaches to the network 100. The mobile device registers the care-of address with its home agent 118. Mobile security associations may be required for communication between/among the mobile device, its home agent and a foreign agent.

When data packets are to be sent to the mobile device 112 by a corresponding node 120, the data packets are addressed to the home address of the mobile device. The data packets are routed through the Internet 122 as normal Internet Protocol (IP) packets until they reach the home subnet of the mobile device. In the home subnet, the home agent 118 of the mobile device intercepts the data packets and encapsulates the intercepted data packets inside data packets that are addressed to the care-of address for the mobile device. The encapsulated packets are then routed on the Internet as normal IP packets until they reach the foreign agent 114 corresponding to the mobile device. In this manner, packets are tunneled through the MIP network. The foreign agent 114 decapsulates the original IP packets and forwards them to the mobile device 112. The mobile device may also perform its own decapsulation functions by means of a co-located care-of address.

Data packets may be treated as normal IP packets when they are sent from the mobile device. When the mobile device moves between points of attachment on the network and changes foreign agent, the mobile device receives a new care-of address and re-registers with its home agent. In this manner, mobility management is performed.

Route Optimization

Route Optimization is an extension of MIP that allows a home agent to inform corresponding nodes about a mobile device's current care-of address so that data packets may be routed to a mobile device away from home without first being forwarded to its home agent. A correspondent node caches a binding associated with a mobile device and tunnels data packets directly to the care-of address indicated in the binding, thereby bypassing the mobile device's home agent. Data packets are also forwarded directly from an old foreign agent to a new foreign agent to reduce disruption during handoff of the mobile device between foreign agents, thereby improving micro-mobility.

However, a mobile device's care-of address is changed each time there is a handoff between foreign agents. Such frequent notification not only increases the amount of control traffic generated, but also places an unnecessary processing burden upon a correspondent node, which may be providing services to hundreds of mobile devices. Until notification of a handoff is completed to the home agent and the correspondent node, data packets destined for the mobile device follow an inefficient delivery path between the old foreign agent and the new foreign agent resulting in excess traffic.

Handoff-Aware Wireless Access Internet Infrastructure (HAWAII)

Figure 2:
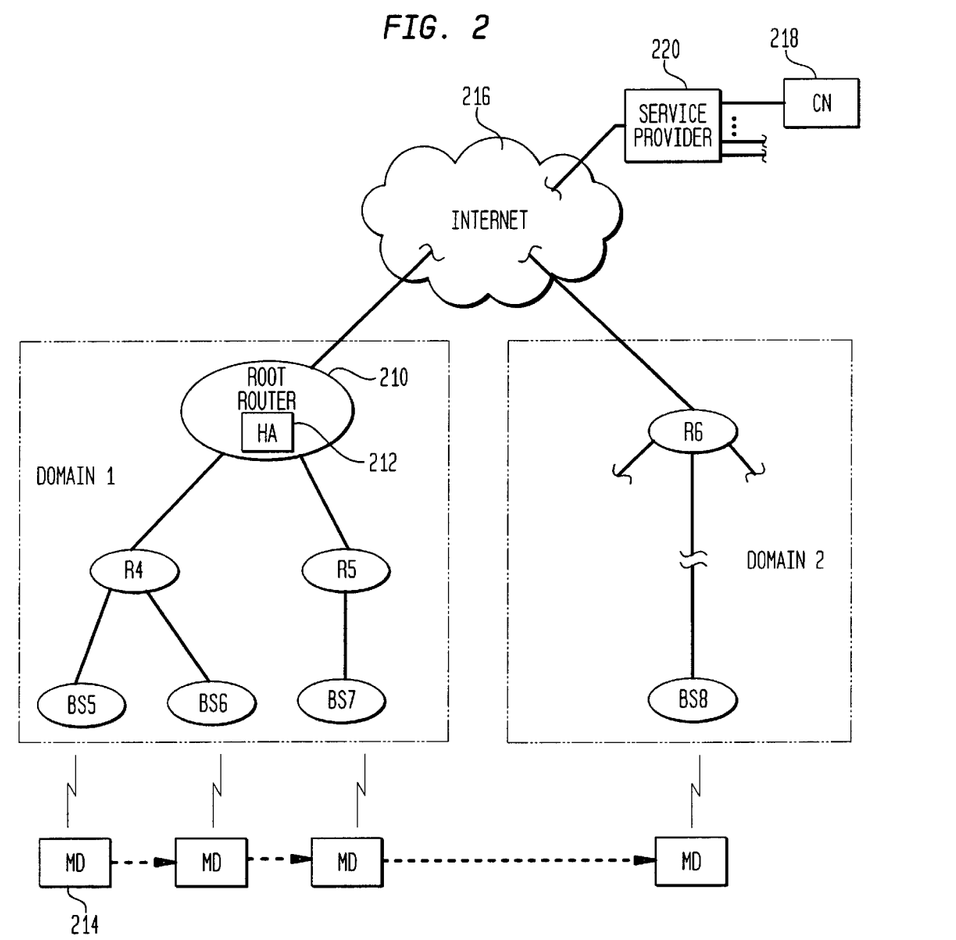
FIG. 2 illustrates the domain-based architecture for a Handoff-Aware Wireless Access Internet Infrastructure (HAWAII) network for mobile devices.

Handoff-Aware Wireless Access Internet Infrastructure (HAWAII) networks address the problems associated with the frequent notification of Route Optimization. FIG. 2 illustrates the domain-based architecture of such a network. The wired access portion of the wireless network is divided into domains, each domain having at least one base station and a common root router. Additional routers may be included in the domain between the common root router and a base station. All data packets destined for a mobile device attached to a base station within a domain are forwarded through the domain's common root router. Selected routers and routing capable base stations within a domain maintain a routing table entry for a mobile device attached to the domain. Routing table entries are established and updated via path setup schemes so that data packets destined for the mobile device are conveyed along the proper established path through a domain, regardless of the domain base station through which the mobile device is attached.

Each mobile device has a home domain, which is a subnet of the HAWAII network that has a domain node that hosts a home agent for a particular mobile device. A foreign domain for a particular mobile device is defined as any domain to which it is attached, other than its home domain. Mobility is typically localized to a single domain, the majority of handoffs between base stations occurring when both the new and old base stations are incorporated within the same domain. Therefore, only local routing table entries in selected routers within the domain need be updated to provide mobility for the majority of mobile device handoffs; the mobile device address and/or care-of address can remain the same for most handoffs. Thus, handoff notifications to nodes outside the local domain, such as to the home agent and the correspondent node, are substantially minimized.

Specifically, shown in FIG. 2 is a wired access portion of a wireless network divided into two domains, Domain1 and Domain2. Domain1 is comprised of a root router 210 through which all packets destined for mobile devices connected to base stations BS5, BS6, or BS7 are routed. Illustratively, routers R4 and R5 are shown as downstream routers utilized within Domain1 to forward data packets to the appropriate base station. A home agent 212 is incorporated at root router 210. In the exemplary embodiment, Domain1 is defined to represent the home domain servicing mobile device 214. Domain2 is a second domain servicing routers and base stations not incorporated within Domain1. Domain2 is therefore representative of a foreign domain. For illustrative purposes, router R6 is shown as a root router for Domain2 and BS8 is shown as a base station of Domain2. Router R6 may be enabled with a home agent (not shown) and root router functionality for those mobile devices having Domain2 as their assigned home domain. Thus, Domain2 is a foreign domain to those mobile devices having home agent functionality residing within root router 210, whereas Domain2 is concurrently a home domain to those mobile devices having home agent functionality residing within router R6.

Each domain provides access to the wired portion of a data packet network, such as the Internet 216, through common root router 210. Base stations of each domain are used by the mobile device to attach to the Internet and exchange data packets thereover with a correspondent node 218 via a service provider 220. Data packets sent from the correspondent node to the mobile device have a packet destination address corresponding to the mobile device, which retains this address for the duration of time it is powered up and attached to the Internet via any base station. Data packets destined for the mobile device are always routed to the mobile device's home domain.

If the mobile device is attached through a base station included within the home domain, data packet tunneling is not required. If the mobile device is attached through a base station included within a foreign domain, the home agent corresponding to the mobile device intercepts data packets having the mobile device's address as a destination address. The home agent tunnels data packets destined for the mobile device to the care-of address for the instant foreign domain. In this case, the care-of address is assigned to the mobile device so that packets are tunneled directly to the mobile device. A singular care-of address is assigned to the mobile device for the duration of time it is powered up and attached to the Internet via any base station included within the instant foreign domain. Within a domain, the data packets are directed to the appropriate base station according to the mobile device's routing table entry for the instant domain.

General Packet Radio Service (GPRS)

Figure 3:
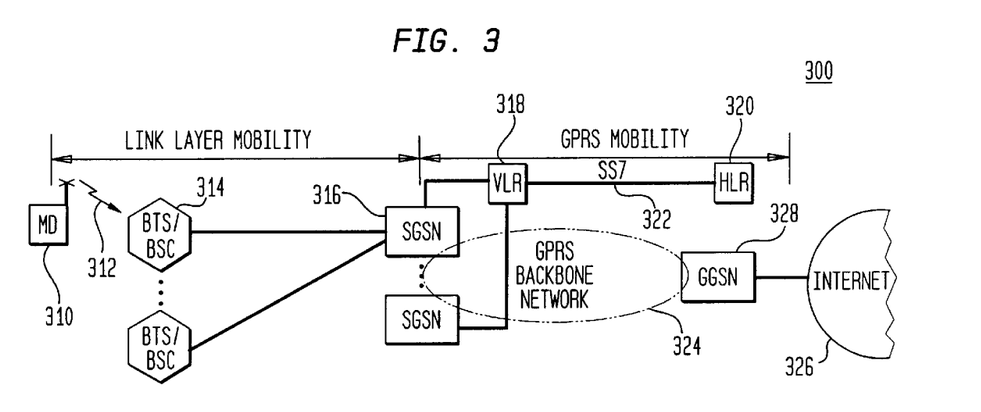
FIG. 3 illustrates an exemplary architecture used to provide mobile devices with General Packet Radio Service (GPRS) wireless access to a Global System for Mobile Communications (GSM) based network.

FIG. 3 illustrates an exemplary architecture used to provide mobile devices with General Packet Radio Service (GPRS) wireless access to a Global System for Mobile Communications (GSM) based network. GPRS provides packet data service for GSM cellular networks with mobility managed according to a combination of link layer and higher layer techniques. A mobile device 310 attaches to the GSM network 300 over an air interface 312 that is terminated on a Base Terminal Station (BTS). Multiple BTSs may be connected to a Base Station Controller (BSC) (shown as a single BTS/BSC entity 314 for simplicity). On the air interface 312, GPRS supports registration, authentication, paging, and handoff (a/k/a cell reselection), as well as procedures for channel access to transmit data packets. The mobile device may operate in two distinct states—an active state where the location of the mobile device's current BTS is known, and a standby state where only an approximate location of the mobile device is known, such as a subnet of BTSs (i.e., a paging area). The standby state enables reductions in the mobile device's battery power consumption by allowing the mobile device to notify the network only when the mobile device moves out of the paging area. If data packets for a mobile device in standby state arrive into the wireless access network, a Serving GPRS Service Node (SGSN) 316 "pages" the mobile device in its paging area to determine the mobile device's current BTS before delivering the data packets.

A two-level hierarchy of databases manage mobility and assist with security. Each SGSN 316 is connected to a Visitor Location Register (VLR) 318 and a Home Location Register (HLR) 320. The VLR maintains a temporary profile of mobile devices that are currently attached to the SGSN. The HLR maintains a permanent database of mobile devices registered with the SGSN and a pointer to the mobile device's current VLR. Whenever a new mobile device move between areas covered by different VLRs and has to be authenticated the VLR contacts the mobile device's HLR via a Signaling Network 322. The HLR replies to the VLR with authentication information that is composed of a set of random challenges and their corresponding responses, which are obtained with the use of a secret key that the HLR shares with the mobile device. By sending the challenges to the mobile device, and comparing its responses with those obtained from the HLR, the VLR performs user authentication. Similarly, for ciphering between the SGSN and the mobile device, the HLR can send to the VLR encryption keys, obtained from the same secret key known only to the mobile device and to the HLR.

In addition to an air interface, GPRS also defines a backbone network 324 for communication to a corresponding node (not shown) via a packet-based network, such as the Internet 326. In the backbone network, GPRS defines a tunneling protocol built on top of an IP network, called Generic Tunneling Protocol (GTP), to handle device mobility, and support registration and authentication procedures. Data packets flowing through the tunnel are encapsulated with an outer GTPIUDP/IP header. This adds 48 bytes of header overhead to each data packet, which is substantial for voice-over-IP applications that transmit data packets with a small payload.

A GTP tunnel extends between the SGSN 316 and a Gateway GPRS Servicing Node (GGSN) 328, which terminate each end of the tunnel. The SGSN 316 directs packets to the proper BTS/BSC using link layer protocols. The GGSN 328 acts as a gateway to the Internet 326. As a mobile device moves between SGSNs, new GTP tunnels are established to manage the mobility. As a device moves between BTS/BSCs on a single SGSN, handoffs are handled at the link layer.

GPRS Accessed Extended Mobile Internet Protocol [G-EMIP]

Figure 4:
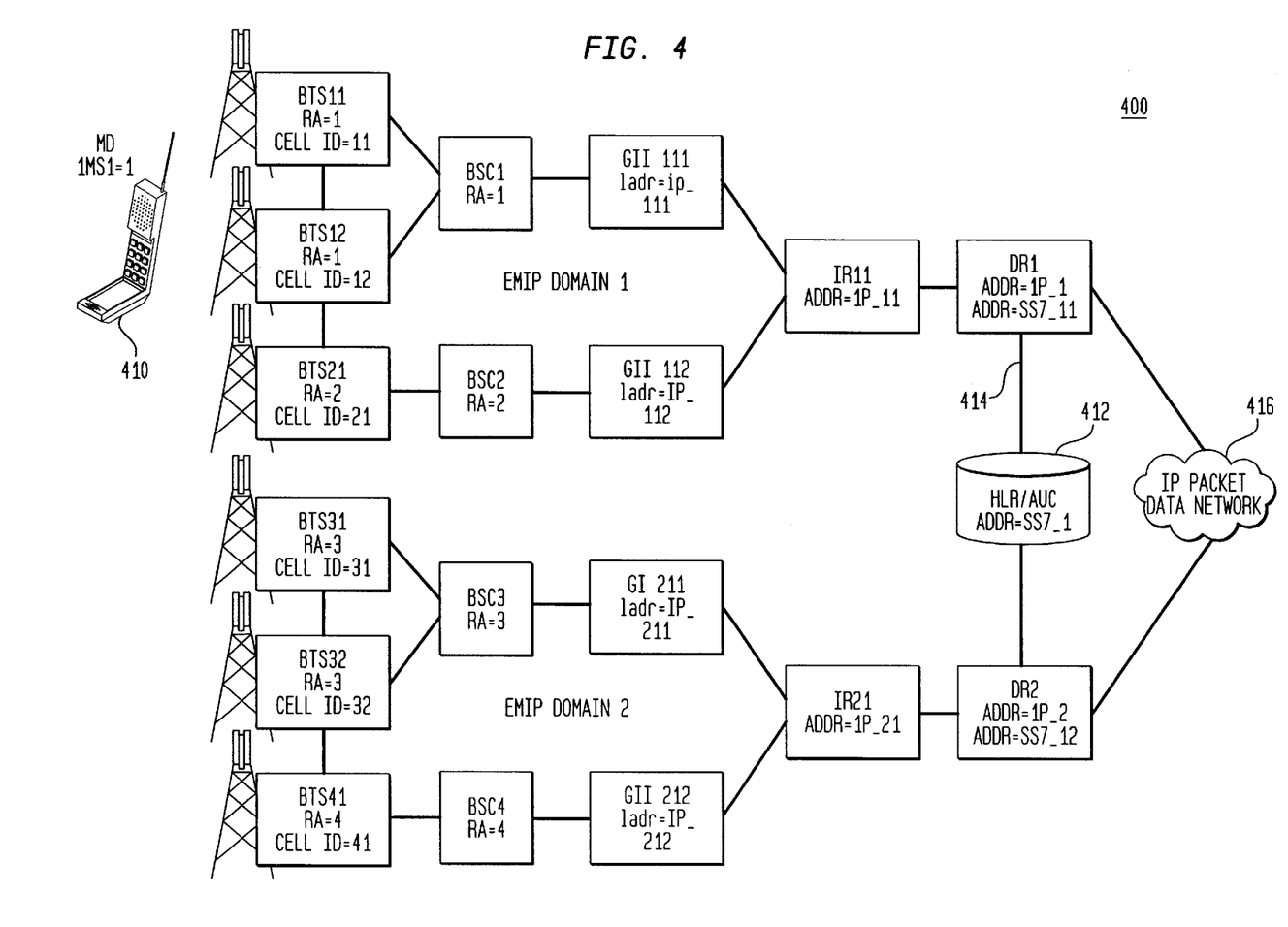
FIG. 4 illustrates the domain-based architecture for a General Packet Radio Service (GPRS) Accessed Extended Mobile Internet Protocol (IP) [G-EMIP] network in accordance with the invention.

FIG. 4 illustrates an exemplary GPRS Accessed Extended Mobile Internet Protocol [G-EMIP] network in accordance with the invention. The G-EMIP network 400 provides wireless access for mobile devices. The G-EMIP network includes the Base Terminal Station (BTS), Base Station Controller (BSC), and Home Location Register (HLR) of a GPRS network and the mobility agents of Mobile IP. The BTS terminates the radio interface, Media Access Control (MAC), and Radio Link Control (RLC) protocols. The BSC is utilized as an access router. The interface of the BSC with the BTS is a bridge over any link layer protocol, and the interface between the BSC and the wired IP backbone network is a GPRS-IP Interworking entity (GII). The GII is a true IP router. The remainder of the G-EMIP network adheres to the Mobile IP (MIP) standard. The G-EMIP network may further adhere to the HAWAII standard.

The network 400 is divided into domains, each domain having a common Domain Router (DR) through which all data packets destined for a mobile device connected to a BTS within that domain are forwarded. The DR has associated with it a Dynamic Host Configuration Protocol (DHCP) server and a home agent. The DHCP assigns a dynamic IP address for mobile devices in the HAWAII local mobility domain scheme. The home agent functions as a standard MIP home agent. Data packets are routed from a DR through the DR's subnet, which comprises an Intermediate Router (IR), GPRS-IP Interworking entities (GIIs), BSCs and BTSs. A mobile device is attached at a BTS. Specifically, shown in FIG. 4 is a network divided into two domains, EMIPDomain1 and EMIPDomain2. EMIPDomain1 is comprised of Domain Router DR11 and its subnet of IR, BSCs and BTSs. All packets destined for mobile devices connected to BTS11, BTS12, or BTS21 are routed through DR11. Illustratively, Intermediate Router IR11 and Base Station Controllers BSC1 and BSC2 are shown as downstream entities utilized within EMIPDomain1 to forward data packets to the appropriate BTS.

BTSs and BSCs are GPRS enabled entities (i.e., addressed using GPRS protocols and messages). DRs and IRs are IP enabled entities (i.e., addressed using IP protocols and messages). Aligned between an IR and a BSC, and associated with each BSC, is a GII. A GII may be addressed using both GPRS and IP protocols and messages. The GII interworks GRPS and IP protocols of received messages (i.e., translates messages from one protocol to the other and/or maps addresses from one protocol to another) and forwards the translated message to the appropriate downstream/upstream subnet entity. Illustratively, GII111 is aligned between BSC1 and IR11, and associated with BSC1.

Figure 5A:
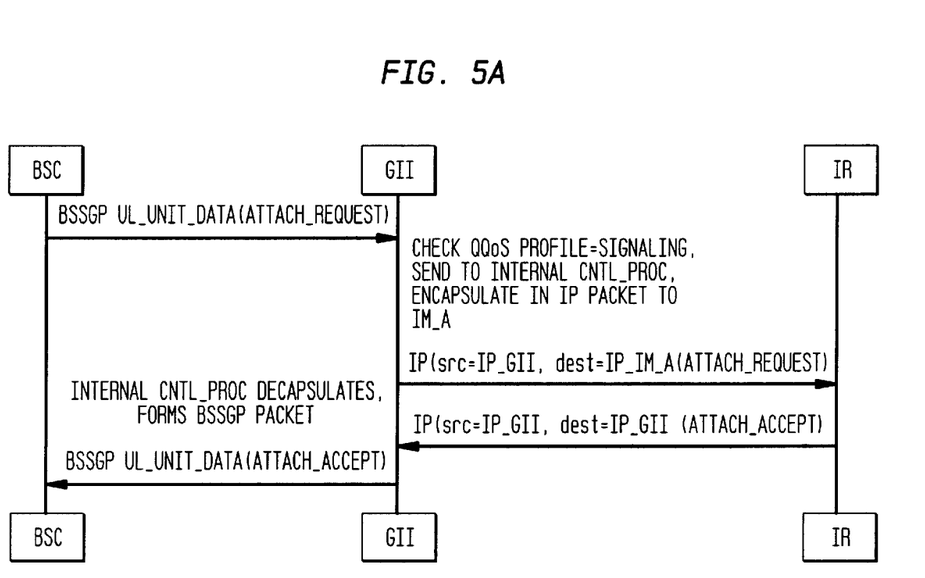
FIG. 5a illustrates the interworking of GPRS and EMIP signaling by a GPRS-IP Interworking entity between a Base Station Controller and a Intermediate Router in accordance with the invention.
Figure 5B:
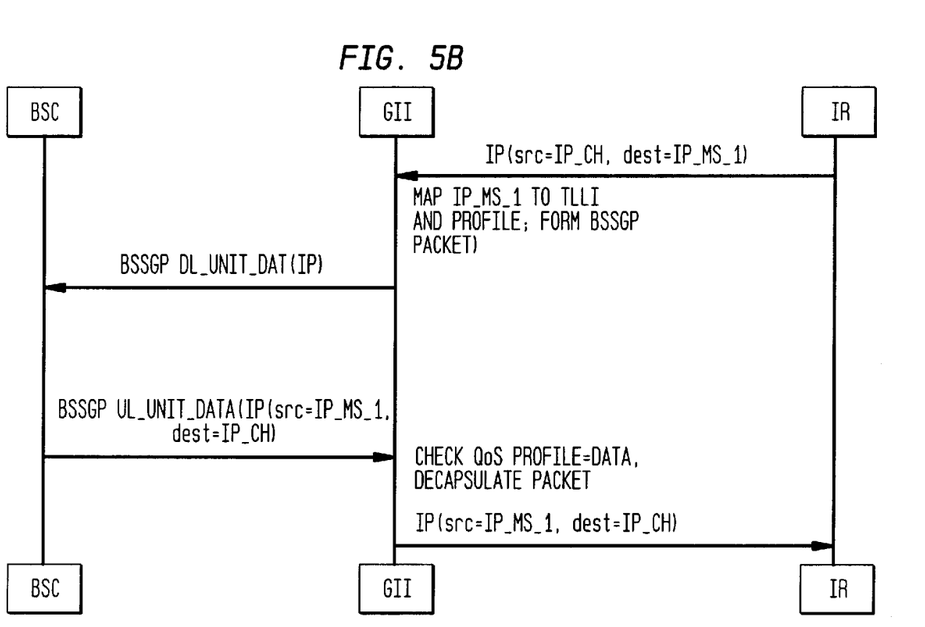
FIG. 5b illustrates the dataflow interworking provided by a GPRS-IP Interworking entity between a Base Station Controller and an Intermediate Router in accordance with the invention.

FIG. 5a illustrates an exemplary interworking of GPRS and EMIP signaling (i.e., translation of signaling) by the GII, which is positioned between a BSC and an IR. The interworking of signaling may encompass checking the Quality of Service (QoS) of a received GPRS signaling message, performing internal processing to determine a corresponding message and encapsulating the GPRS message in a IP packet addressed to an IP node, such as a Domain Router. Signaling interworking may also encompass decapsulating an IP message and forward the decapsulated GPRS message to a GPRS node, such as a Base Station Controller. Referring to FIG. 5b, the dataflow interworking provided by a GII is illustrated. Dataflow interworking may encompass mapping an IP addressed message received at the GII to a Temporary Logical Link Identity (TLLI) and profile for a mobile device and forming a corresponding GPRS message addressed to the mobile device identified by the TLLI and profile. Dataflow interworking may also encompass checking the QoS of a received GPRS signaling message and decapsulating an IP message from the GPRS packet. It should be noted that the domain may be condensed to a smaller hierarchy of network entities. In that case, the GII would be in communication with the BTS and the DR.

Referring again to the exemplary embodiment of FIG. 4, EMIPDomain1 is defined to encompass a subnet representing the home domain servicing a mobile device 410. A DHCP server and a home agent (not shown) are incorporated at Domain Router DR1. It should be noted that the home agent may alternatively be implemented in any local router or node capable of communicating with the other entities within the home domain or in a separate co-located processor and memory, such as that available in a personal computer. The Domain Router DR1 is also enhanced to interact with a Home Location Register/Authentication Center (HLR/AUC) 412 via signaling network 414. For example, the DR and the HLR/AUC may communicate via a Signaling System Seven (SS7) network. The HLR/AUC provides GRPS registration, authentication and encryption for mobile devices attached to the G-EMIP network. The Domain Router DR1 also provides access to an Internet Protocol (IP) packet network 416. The DR may provide access to any external Internet Protocol (IP) based network, such as the Internet or the Public Switched Telephone Network/Integrated Services Digital Network (PSTN/ISDN).

EMIPDomain2 is presented as an exemplary subnet representing a second domain servicing BTSs not incorporated within EMIPDomain1. EMIPDomain2 is therefore representative of a foreign domain. Incorporated within EMIPDomain2 are a DR and IR servicing one or more GII, BSC and BTS. For illustrative purposes only, EMIPDomain2 is shown with Domain Router DR2 servicing Base Transceiver Station BTS31 through Intermediate Router IR21, GPRS IP Interworker GII211 and Base Station Controller BSC3. It should also be noted that Domain Router DR2 is enabled with DHCP server, home agent and other domain router functionality for those mobile devices having EMIPDomain2 as their assigned home domain. Thus, EMIPDomain2 would be a foreign domain to those mobile devices having home agent functionality residing within domain router DR1, whereas EMIPDomain2 would concurrently be a home domain to those mobile devices having home agent functionality residing within domain router DR2.

Mobility

The GPRS portion of the network provides packet access at the radio interface. GPRS wireless link specific processing is relegated to only the GPRS addressable portion of the network (i.e., BTSs, BSCs and GIIs), which acts as a level 2 bridge to the air interface. The EMIP portion of the network is utilized as a backbone network for the cellular packet wireless data and provides mobility and service management and interconnection to external networks. GRPS registration, authentication and encryption for mobile devices attached to the G-EMIP network is provided by the HLR/AUC, which is accessed over the backbone network.

Once a change in network attachment is detected, a handoff (a/k/a a mobility update in GPRS) must occur for the mobile device to continue to receive data. To do this, routing tables, or their equivalents, must be updated in the network. However, since the G-EMIP network of the invention is not a pure MIP network, all mobility can not be handled at the IP level. Mobility between two BTSs on a common BSC cannot be handled at the IP level because the BTSs are not assigned IP addresses and are not IP routers. In a GII, a mapping exists between the IP address of the mobile device, the link layer connection to the BTS and the air interface connection with the mobile device. To perform a handoff requires mapping packets arriving at the agent of the DR on a different outgoing link to a BTS. Therefore, there are two levels at which handoffs must be handled. At the lowest level, link level mobility is provided; above this level, IP level mobility is provided. The GII marks the boundary between these two levels.

Mobility between BTSs attached to the same BSC within a domain are handled by link layer techniques. Such an Intra-BSC cell update uses standard GPRS communications and will involve updating only the BSC and the GII, while the IR and DR of the domain maintain their mappings. Other mobility-related functionality is handled at the IP (network) layer. The Internet standard, Mobile IP supports macro-mobility of mobile hosts and Handoff-Aware Wireless Access Internet Infrastructure (HAWAII) supports micro-mobility and paging functionality in the wireless network of the invention. Inter-BSC movement is handled according to the HAWAII standard. An Inter-BSC cell update requires notifications similar to standard GSM but with the additional notification of the IP addressed IR. Inter-domain movement requires notification of the DR and its associated HLR; first GRPS attach and authentication procedures are undertaken, then a dynamic IP address for the mobile device is assigned by the DHCP server associated with the DR, and then HAWAII mobility procedures are utilized. To support authentication and roaming, the HLR/AUC is used for authenticating the access to the air interface and MIP/HAWAII transactions. After first connection of a mobile device within a domain, data flow in subsequent domains is based on MIP.

CONCLUSION

There has been described and illustrated herein, a G-EMIP network architecture for interworking Mobile Internet Protocol (MIP) with cellular networks so that Internet-based technology can be applied to mobile wireless networks allowing wireless/wireline integration and reducing network costs. Mobility management is implemented with combination of standard GPRS and MIP network entities linked via a GPRS Interworking Entity (GII). Mobility may further be enhanced utilizing the HAWAII standard. GPRS link level handoffs are used for fine-grained mobility and IP level handoffs are used for larger scale mobility. The GII translates messages from one protocol to another and directs the translated message to the appropriate upstream/downstream G-EMIP network entity.

It is to be understood that the invention is not limited to the illustrated and described forms and embodiments contained herein. It will be apparent to those skilled in the art that various changes using different configurations and functionally equivalent communication protocols, components and programming may be made without departing from the scope of the invention. Thus, the invention is not considered limited to what is shown in the drawings and described in the specification and all such alternate embodiments are intended to be included in the scope of this invention as set forth in the following claims.

What is claimed is:

1. A network for providing a mobile device with wireless access to an external network, said network comprising:
at least one base station comprising a base station controller having a General Packet Radio Service (GPRS) address accessed utilizing a first protocol, and
one or more base transceiver stations interconnected with said base station controller, each of said base transceiver stations providing an air interface to a mobile device;
one or more interworking entities, each entity using a GPRS address and accessed utilizing said first protocol and having an Internet Protocol (IP) address and accessed utilizing a second protocol and interconnected to one or more base stations including the at least one base station and comprising a receiver for receiving a message in the first protocol and for receiving a message in the second protocol, a processor for translating said message in said first protocol into a corresponding message in said second protocol and for translating said message in said second protocol into a corresponding message in said first protocol, said processor mapping said GRPS address to an Internet Protocol (IP) address and mapping said IP address to said GPRS address, and a transmitter for transmitting said corresponding message in said first protocol and for transmitting said corresponding message in said second protocol;
a router interconnected with each of said interworking entities, said router having an IP address and accessed utilizing said second protocol, said router providing a connection to an external network and providing mobility support for a mobile device according to said second protocol, said router further comprising a Dynamic Host Configuration Protocol server for assigning a dynamic address of said IP address to said mobile device, and a home IP agent; and
a home location register/authentication center interconnected with said router, said home location register/authentication center providing authentication, registration and encryption for said mobile device attached to the at least one base station wherein said base station, interworking entities and router comprise a first domain and are operable to update associated routing tables utilizing path setup messages said center further and assigning a dynamic address of said GPRS address to said mobile device when said mobile device first attaches to said network.

2. The network of claim 1, wherein said external network is selected from the group consisting of packet-based networks, Internet Protocol-based networks, Public Switched Telephone Networks and Integrated Services Digital Networks.

3. The network of claim 1, wherein said first protocol and said second protocol are selected from the group consisting of General Packet Radio Service (GPRS), Code Division Multiple Access (CDMA) and Mobile Internet Protocol (MIP).

4. A method of providing wireless access to a packet-based network, said method comprising the steps of:
defining a first domain, said first domain including a first group of base stations and interworking entities and a router, said base stations addressed according to a first protocol, said router addressed according to a second protocol, said interworking entities addressed according to said first protocol and said second protocol;
providing a home agent for a mobile device within said first domain;
providing a home location register/authentication center interconnected with said first domain to provide authentication, registration and encryption for said mobile device;
assigning an IP address of said second protocol and a GPRS address of said first protocol to said mobile device, said GPRS address and said IP address utilized for delivery of a plurality of packets to said mobile device when said mobile device is attached to said packet-based network through said first domain;
delivering said plurality of packets in said second protocol to one of said interworking entities addressed by said IP address;
interworking said plurality of packets from said second protocol to a corresponding plurality of packets in said first protocol addressed to said GPRS address wherein said step of interworking includes the steps of:
checking a Quality of Service of a signaling message of said first protocol that has been delivered to one of said interworking entities;
determining a corresponding message of said second protocol;
encapsulating a signaling message of said first protocol in said corresponding message of said second protocol, said corresponding message addressed to said IP address;

decapsulating said signaling message of said first protocol from a signaling message of said second protocol;

forwarding said signaling message of said first protocol; and forwarding said corresponding message of said second protocol;

delivering said plurality of packets in said first protocol to one of said base stations addressed by said first address; and updating routing table entries of said first group of base stations and the interworking entities and the router within said first domain utilizing path setup messages.

5. The method in accordance with claim 4 further including the steps of:

receiving, at said home agent, a third address for said mobile device when said mobile device is attached to said packet-based network through one of said base stations excluded from said first domain; and tunneling said plurality of packets from said home agent to said third address for said mobile device if said mobile device is attached to said packet-based network through said base station excluded from said first domain.

6. The method in accordance with claim 4 wherein said step of interworking includes the steps of:

mapping a data message addressed to said GPRS address to a data message addressed to said IP address;

forming a corresponding data message of said first protocol addressed to said mobile device identified by said GPRS address;

forwarding said corresponding data message of said first protocol.

7. The method in accordance with claim 4, wherein said step of interworking includes the steps of:

checking a Quality of Service of a data message of said first protocol that has been delivered to one of said interworking entities;

decapsulating a data message of said second protocol from said data message of said first protocol; and forwarding said data message of said second protocol.

8. The method in accordance with claim 4 further comprising the step of:

utilizing Mobile Internet Protocol for supporting macro-mobility of said mobile device.

9. The method in accordance with claim 8, further comprising the step of:

utilizing Handoff-Aware Wireless Access Internet Infrastructure (HAWAII) for supporting micro-mobility and paging of said mobile device.

10. The method in accordance with claim 4 wherein a plurality of intermediate packet routers are included within said first domain to interconnect said interworking entities to said router over a wired portion of said packet-based network.

11. The method in accordance with claim 4 wherein said IP address continues to be utilized for delivery of said plurality of packets to said mobile device when said mobile device is handed off to any base station included within said first domain.

12. The method in accordance with claim 4 wherein said GPRS address is updated when said mobile device is handed off to any base station included within said first domain.

13. The method in accordance with claim 4 wherein said GPRS address and said IP address are associated with said mobile device for as long as said mobile device is attached to one of said base stations included within said first domain.

14. The method in accordance with claim 4 wherein the routing table entries corresponding to said GPRS address and said IP address at said first group of base stations and interworking entities and router are updated to forward said plurality of packets to said mobile device whenever said mobile device is attached to said packet-based network through one of said first group of base stations.

15. A method of providing wireless access to a packet-based network, said method comprising the steps of:

defining a domain, said domain including a plurality of base stations interconnected with a plurality of interworking entities each entity accessible using a GPRS or IP address and interconnected with a plurality of routers to provide said wireless access to said packet-based network for a mobile device;

assigning a first domain-based address to said mobile device;

assigning a second domain-based address to said mobile device;

messaging selected ones of said plurality of base stations and selected ones of said plurality of interworking entities and selected ones of said plurality of routers to update a routing table entry to reflect a present point of attachment of said mobile device to a single one of said base stations;

receiving, at one of said plurality of routers, a packet having said first domain-based address as a packet destination address;

routing said packet over a router interface determined by look-up of said first domain-based address corresponding to said routing table entry;

repeating said steps of receiving and routing until said packet is received at a single one of said interworking entities;

interworking said packet from said second domain-based address to said first domain-based address;

receiving, at one of said plurality of base stations, the packet having said first domain-based address as the packet destination address;

routing said packet over a base station interface determined by look-up of said first domain-based address corresponding to said routing table entry;

repeating said steps of receiving and routing until said packet is received at said mobile device; and providing authentication, registration and encryption for said mobile device by a home location register/authorization center.

* * * * *